Jan. 19, 1954       E. E. BERRY       2,666,450
INDEXING VALVE
Filed March 21, 1950
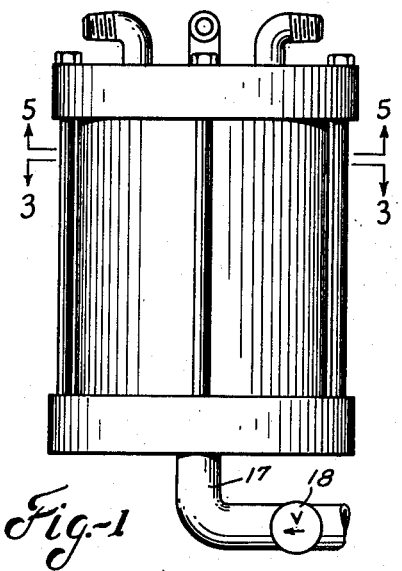
Fig.-1
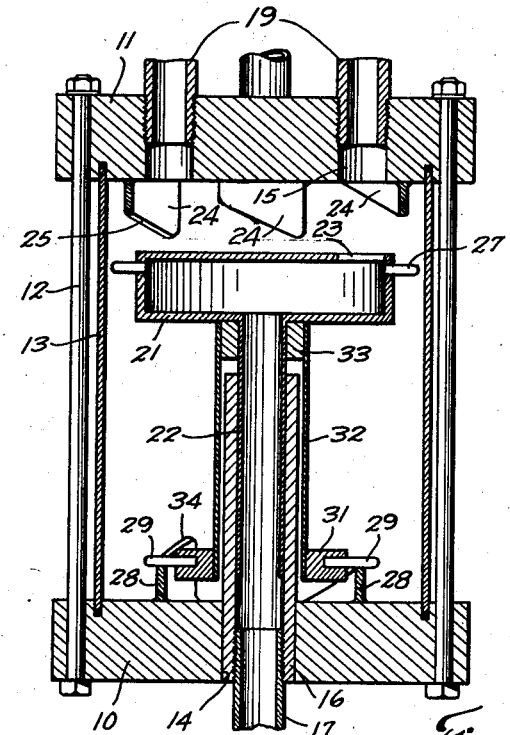
Fig.-2
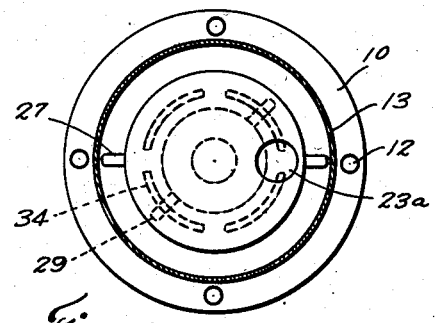
Fig.-3
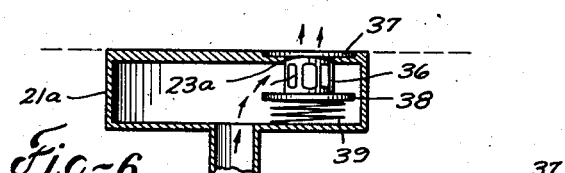
Fig.-6
Fig.-7
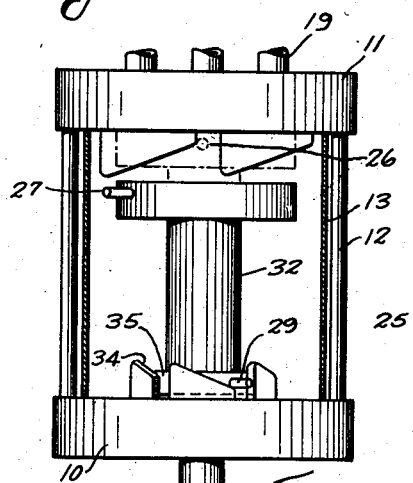
Fig.-4
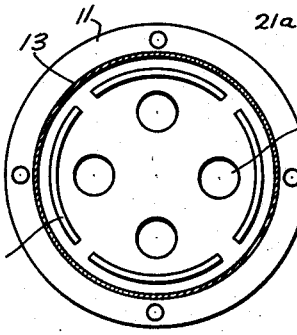
Fig.-5
Inventor
Earl E. Berry
Tom Walker
attorney

Patented Jan. 19, 1954

2,666,450

UNITED STATES PATENT OFFICE 2,666,450

INDEXING VALVE

Earl E. Berry, Dayton, Ohio

Application March 21, 1950, Serial No. 150,890

7 Claims. (Cl. 137—633)

This invention relates to sequentially operated valves, and more particularly to an indexing type of valve usable for example in connecting a household water supply system to each of a series of lawn sprinklers in turn.

The object of the invention is to simplify the construction as well as the means and mode of operation of indexing valves as disclosed herein, whereby such valves may not only be economically manufactured, but will be more efficient and satisfactory in use, adaptable to a wide variety of uses, having relatively few parts and be unlikely to get out of repair.

A further object of the invention is to make the indexing function of the device automatic and responsive to the opening and closing of a valve communicating the device with the source of the pressure fluid to be distributed.

Another object of the invention is to utilize the pressure of the fluid being distributed to accomplish indexing movements of the valve.

A further object of the invention is to accomplish one full indexing step of the device in component parts respectively related to the opening and closing of the communicating control valve.

Still another object of the invention is to make a novel use of complementary cam mechanisms for effecting the aforesaid indexing step components.

A still further object of the invention is to provide a simple and inexpensive device of the class described capable of ready installation in existing fluid distribution systems.

A further object of the invention is to provide a valve possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In carrying out the foregoing objects, there is contemplated a relatively simple valve in which there is but a single moving part, the movement thereof being limited to a simultaneous combined reciprocatory and rotary motion of predetermined extent, such motion being induced by pulsations in flow pressure of the fluid supply to which the valve is attached.

Referring to the accompanying drawing, wherein is found the preferred but obviously not necessarily the only form of embodiment of the invention, Fig. 1 is a view in side elevation of a valve in accordance with the instant invention;

Fig. 2 is a view, enlarged with respect to Fig. 1, of the device in longitudinal section;

Fig. 3 is a view in cross section, taken substantially along the line 3—3 of Fig. 1;

Fig. 4 is a view similar to Fig. 1 with the housing of the device removed;

Fig. 5 is a view in cross section along the line 5—5 of Fig. 1;

Fig. 6 is a detail view showing a check valve construction which may be incorporated in the device, the valve being shown in its open position; and Fig. 7 is a view like Fig. 6, showing the check valve closed.

Like parts are indicated by similar characters of reference throughout the several views.

Referring to the drawing, in its illustrated form, the indexing valve comprises a pair of plates 10 and 11 held in aligned spaced apart relationship by a circumferential series of tie rods 12. Within the area enclosed by the tie rods 12, and extending between the plates 10 and 11 is a cylindrical housing 13, the ends of which are received in recesses in the adjoining faces of the plates.

The plate 10 presents a single axial opening 14 while the plate 11 presents a circular series of longitudinal openings 15 in concentric relation to the opening 14. Having a press fit in the opening 14, and extending within housing 13 toward plate 11, is a cylinder 16 receiving at its lower or outer end a pipe 17. The pipe 17 communicates with a source of fluid under pressure which is alternatively admitted and denied access to the cylinder 16 by opening and closing a valve 18. The openings 15, in plate 11, receive through the outer face of the plate connectors 19 to which hose or pipe lines may be attached to conduct pressure fluid to a plurality of remote points.

The pressure fluid reaches the openings 15 from the cylinder 16 by way of a selector mechanism comprising a hollow piston 21 having a tubular stem 22 communicating with the piston 21 and supported within cylinder 16 with a loose fit. Fluid admitted to cylinder 16 accordingly flows through the tubular stem 22 to the piston 21, from whence it may escape through an opening 23 radially offset from the axis of the piston and underlying the circular series of openings 15.

The mounting of the piston 21 is such as to provide for freedom of axial and rotary movements thereof with respect to the stationary parts of the device including plates 10 and 11 and cylinder 16. Axial extension of the piston toward plate 11 is accomplished by the pressure and velocity of the fluid entering through cylinder 16, such extension being limited by engagement of the piston with the underside of plate 11 where opening 23 may register and communicate with an opening 15. Axial retraction of the piston, effected by gravity or other suitable means, occurs upon closing of the valve 18 shutting off the supply of pressure fluid.

During each upward and downward movement of the piston, a rotary indexing of the piston takes place so that outlet opening 23 may be communicated successively with the distributor openings 15. The apparatus for performing this function includes a plurality of cam lobes 24 formed integrally with or otherwise secured to the underside of plate 11. The several cam lobes 24 are spaced from one another in a circular arrangement surrounding the series of openings 15. Each lobe presents a sloping edge 25 and the several lobes are in series with the low point of one lobe in adjacent relation to the high point of the next succeeding lobe. By reason of the spaced relation of the lobes there occurs between the described adjoining surfaces of adjacent lobes a space or slot 26 the bottom of which is defined by plate 11.

Cooperating with the cam lobes 24 is one or more, in the present instance two, follower devices on the piston 21 in the form of radially projecting pins 27. The follower pins 27 are diametrically opposed on the piston 21, and, during extension of the piston, engage a diametrically opposed pair of lobes 24. In response to continued axial thrust of the piston under fluid pressure the pins 27 ride down the surfaces 25 on the lobes 24, imparting a rotary twist to the piston, until the pins enter slots 26 at which time the piston is pressed against the plate 11. The construction and arrangement of parts, it will be understood, is such that upon the arrival of pins 27 in slots 26 the outlet opening 23 has been brought into registry with an opening 15 in plate 11.

Through similar apparatus a supplemental component of rotary motion is imparted to the piston 21 during the retracting stroke in order that the pins 27 may be moved from the slots 26 to cooperative relation with the next succeeding pair of cam lobes 24. Such similar apparatus includes a set of cam lobes 28 on the upper surface of plate 10 constructed and arranged like the lobes 24 but rotated forty-five degrees (45°) relative thereto and providing for a shorter length of travel of follower devices thereon. Such follower devices are represented by diametrically opposed radial pins 29 set in a ring 31 secured to the lower end of a sleeve 32. The sleeve 32 is in spaced surrounding relation to the cylinder 16 with the upper end thereof secured to the piston 21 through a press fit upon a collar 33 in turn having a press fit upon the tubular stem 22.

The lower set of cam lobes 28 present upwardly facing sloping surfaces 34 and define intermediate slots 35. The arrangement of the cam lobes 28 and location of coacting pins 29 is complementary to the arrangement and location of the cam lobes 24 and pins 27. Thus, while the pins 27 are traveling along the slopes 25 of cam lobes 24, the pins 29 are being elevated and turned out of registry with the slots 35 into overlying relation to a next succeeding pair of cam lobes 28. Similarly, while the pins 29 are traveling over the slopes 34 of cam lobes 28, the pins 27 are being lowered and turned out of registry with the slots 26 to underlying relation with the next succeeding pair of cam lobes 24.

Merely as an example the illustrated embodiment of the invention is usable as a control device to direct water successively to remotely located lawn sprinklers. There are, in this instance, four openings 15, each connected to a different sprinkler, and a corresponding number of cam lobes 24 and cam lobes 28. The parts normally occupy substantially the positions shown in Fig. 2, wherein the valve 18 is closed to shut off the water pressure from the device, it being understood that the pipe 17 leads from the household water supply system wherein pressures of twenty-five to sixty pounds ordinarily prevail. It will be further understood that the device normally stands in an upright position in which the piston assembly is retracted by force of gravity. As so positioned, the piston assembly, which is relatively heavy, is in a lowermost position which may be defined by engagement of the collar 33 with the top of cylinder 16 or by engagement of ring 31 with the plate 10, or by other means. The pins 29 are at this time in slots 35 between cam lobes 28 while pins 27 are in underlying relation to a pair of cam lobes 24. Outlet opening 23 at this time occupies a position intermediate the axes of an adjacent pair of the openings 15.

Now, if valve 18 is turned on or opened, water under pressure flows into cylinder 16 and upward into piston 21 causing the piston and its assembly including stem 22, sleeve 32 and ring 31 to rise or be extended toward plate 11. In the course of such movement, follower pins 27 engage the slopes 25 on the overlying cam lobes 24 and at the same time pins 29 on ring 31 rise out of slots 35 in position to clear the lobes 28. Continued motion of the piston assembly under the applied water pressure will, therefore, be a compound movement including an axial component and a rotary component. Both motions will end when the piston 21 reaches plate 11, the pins 27 having by this time dropped into slots 26 and the pins 29 having moved to a position overlying a pair of cam lobes 28. Arrival of the parts in this position coincides with arrival of the outlet opening 23 at an opening 15. The pipe line 17 is accordingly connected through the piston 21 and opening 23 to one of the openings 15 and thereby to one of the remotely located sprinklers. As long as the valve 18 remains open, admitting water under pressure to piston 21 the parts will maintain the positions described.

Upon closing of valve 18, however, the pressure sustaining piston 21 in extended position is cut off and the piston is retracted under the influence of gravity. In the initial part of this movement, the pins 27 descend out of slots 26 and pins 29 engage cam lobes 28. As retracting motion continues, the pins 29 ride down the slopes 34 on lobes 28 into slots 35 effecting thereby a further rotation of the piston assembly, bringing the pins 27 into position for cooperative relation with the next succeeding pair of cam lobes 24. The parts are so conditioned for another operation in which opening of the valve 18 will cause the outlet opening 23 to be connected to the next succeeding opening 15. In each cycle of valve adjustment, including a closing and opening thereof, there takes place, therefore, a rotary indexing of piston 21 whereby the water supply system is disconnected from one sprinkler and connected to another, the several sprinklers being connected to the system individually and in a predetermined order.

In order to avoid wastage of water in the interval after opening of valve 18 and before contact of piston 21 with plate 11, there may be arranged in the opening 23 a check valve, for example as shown in Figs. 6 and 7. As there illustrated, a piston 21a presents an opening 23a. Within the opening 23a is a cylindrical perforate body 36 having flanges 37 and 38 attached to the ends thereof respectively outside and inside the piston 21a. The tubular body opens through the flange 37 to the exterior of the piston. A spring 39 urges the body 36 outward to engage flange 38 with the internal piston wall and thereby prevent the escape of fluid from piston 21a. This is the position shown in Fig. 7. Outer flange 37 is engageable with the plate 11 during extension of the piston to move body 36 inward to the position of Fig. 6 where flow through the body and therefore through opening 23a is permitted.

With regard to the action of the piston assembly, it will be understood that the piston 21 and cylinder 16, as well as pipe 17 beyond valve 18, will normally be filled with water. The small amount of water which must be displaced for retraction of the assembly can flow out of opening 23 into the area enclosed by housing 13. In the event opening 23 is closed by a check valve, as in Figs. 6 and 7, the displaced water can escape around the loosely fitting stem 22 over the top of cylinder 16. No back pressure can be built up within the housing 13 since this area is in effect connected to atmosphere by the several openings 15. If desired, the interior of the housing could be connected to a suitable place of drain.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. In a pressure fluid operated indexing valve, a hollow piston including spaced walls and a tubular stem, means for mounting said piston in a vertical position for freedom of axial and rotary movements, means for admitting pressure fluid to said piston through said tubular stem to effect an axial extending motion of said piston, said piston being retracted from extended position by gravity in response to shutting off of the pressure fluid, cam means utilizing the reciprocatory axial motion of said piston to effect rotary step by step adjustment thereof, a pressure fluid outlet in one of said walls of said piston parallel to but radially offset from said tubular stem and moved to successively different circumferential positions in response to the step by step indexing of said piston, and a distribution head presenting a circular series of openings, the outlet in said piston being in exclusive communication with a different opening in said series of openings in each different circumferential position thereof.

2. In a pressure fluid operated indexing valve, a housing including spaced apart interconnected mounting plates, one of said plates having one longitudinal opening therein and the other plate having a circular series of longitudinal openings, a cylinder fixed in the longitudinal opening in said one plate and extending toward said other plate, a piston assembly including a piston and a tubular stem therefor received by said cylinder with freedom of relative axial and rotary movements, means for admitting pressure fluid through said cylinder and tubular stem to said piston to extend said piston assembly, the extension of said assembly being limited by engagement of said piston with said other plate, said piston assembly being retracted in response to the shutting off of pressure fluid, an outlet opening in said piston radially offset from the axis of said piston to register selectively with openings in the series of openings in said other plate, and cam means utilizing the axial movements of said piston assembly to index said piston assembly in a rotary direction to effect successive registry of said outlet opening with the openings of said series of openings.

3. A pressure fluid operated indexing valve, including spaced apart interconnected mounting plates, one of said plates having an axial opening therein and the other of said plates having a circular series of longitudinal openings, a cylinder fixed in the axial opening in said one plate and extending toward said other plate, a piston assembly including a hollow piston between said plates, a tubular stem communicating with said piston and loosely received in said cylinder, and a sleeve in surrounding relation to said cylinder; means for admitting pressure fluid through said cylinder and tubular stem to said piston to extend said piston assembly, the extension of said assembly being limited by engagement of said piston with said other plate, said piston assembly being retracted in response to the shutting off of pressure fluid, a radially offset outlet opening in said piston registrable with individual openings in the circular series of openings in said other plate, and cooperating cam portions respectively on the sleeve of said piston assembly and said one plate and on said piston and said other plate constructed and arranged to effect a rotary indexing of the piston assembly during each reciprocation thereof to bring said outlet opening successively into registry with the individual openings in said circular series of openings.

4. A pressure fluid operated indexing valve according to claim 3, characterized in that said cam means includes a first set of cams on said other plate and cooperating portions on said piston to move said outlet opening into registry with an opening of said circular series of openings during extension of said piston assembly, and further includes a second set of cams on said one plate and cooperating portions on said sleeve operative during retracting movement of said piston to bring the portions on said piston into position for cooperative relation with said first set of cams.

5. A pressure fluid operated indexing valve, including spaced apart interconnected inner and outer plates, a piston supported by one of said plates for axial reciprocatory motion toward and from the other of said plates and for rotary movement relative thereto, means for admitting pressure fluid to said piston for extension thereof, such extension being limited by said other plate, said piston being retracted in response to shutting off of the pressure fluid, an annular series of openings in said outer plate and an outlet opening in said piston to be brought into successive registry with said series of openings, a plurality of annularly spaced cam lobes on the underside of said other plate, one or more follower devices on said piston to ride down aligned cam lobes during extension of said piston to positions intermediate adjacent lobes corresponding to a position of registry of said outlet opening with one of said series of openings, and a second series of similar cam lobes cooperative with said piston during retraction thereof to turn said piston for alignment of said follower devices with successive cam lobes on the other plate.

6. A pressure fluid operated indexing valve according to claim 5, characterized in that the second said series of cam lobes is made operative with respect to the piston by cooperation of the piston and the first said set of cam lobes during the extension of the piston, the construction and arrangement being such that said piston completes one indexing step in two components of motion occurring respectively during extension and retraction of the piston.

7. In a pressure fluid operated indexing valve, a housing including spaced apart inner and outer plates, said outer plate presenting a circular series of individual openings, a piston supported by said inner plate for extending and retracting motion toward and from said outer plate and for rotary motion relative thereto, said piston being extensible under the influence of pressure fluid supplied thereto and retractible in response to the shutting off of such pressure fluid, an outlet opening in said piston to be brought successively into registry with the individual openings of said series of openings by a step by step rotary indexing of said piston, a normally closed check valve in said outlet opening arranged to be opened by contact with said outer plate during extending motion of the piston, and cooperating cam portions on said housing and said piston imparting components of rotary motion to said piston during each extension and retraction thereof accomplishing in sum effect one full indexing step of the piston.

EARL E. BERRY.

References Cited in the file of this patent

UNITED STATES PATENTS

| Number | Name | Date |
|---|---|---|
| 1,326,046 | Goodhue | Dec. 23, 1919 |
| 2,368,832 | Hauser | Feb. 6, 1945 |